United States Patent [19]
Enders et al.

[11] Patent Number: 5,920,009
[45] Date of Patent: Jul. 6, 1999

[54] METHOD FOR GENERATING A CERTAIN CONSTANT PRESSURE IN A TEST LIQUID OF A TEST APPARATUS

[75] Inventors: Thomas Enders, Marienberg; Marcus Fahnle, Grossbottwar, both of Germany

[73] Assignee: Robert Bosch GmbH, Stuttgart, Germany

[21] Appl. No.: 08/996,592

[22] Filed: Dec. 22, 1997

[30] Foreign Application Priority Data

Dec. 20, 1996 [DE] Germany .......................... 196 53 309

[51] Int. Cl.⁶ .................................................. G01M 15/00
[52] U.S. Cl. ....................................................... 73/119 A
[58] Field of Search ................................. 73/1.27, 1.28, 73/1.36, 1.47, 1.96, 119 A; 417/44.9, 46, 140, 204, 206

[56] References Cited

U.S. PATENT DOCUMENTS

| | | | |
|---|---|---|---|
| H928 | 6/1991 | Gallegos | 430/203 |
| 3,168,045 | 2/1965 | Sebastiani | 417/383 |
| 3,496,879 | 2/1970 | Brandes | 417/46 |
| 3,807,235 | 4/1974 | Lefkovits et al. | 73/863.32 |
| 3,936,237 | 2/1976 | Chattopadhayat et al. | 417/311 |
| 4,331,262 | 5/1982 | Snyder et al. | 75/1.27 |
| 4,788,858 | 12/1988 | Liebermann | 73/119 A |
| 5,134,962 | 8/1992 | Amada et al. | 118/688 |

*Primary Examiner*—Hezron Williams
*Attorney, Agent, or Firm*—Edwin E. Greigg; Ronald E. Greigg

[57] ABSTRACT

In known methods for generating a predetermined constant pressure in a test liquid of a test apparatus, the test liquid is acted upon by compressed gas that is pumped continuously by a pump and is vented into the atmosphere once the test procedure is completed. This not only makes for an expensive consumption of compressed gas but also causes fluctuations in the pressurized liquid and generates noise. In this method, the pressurized liquid is pumped into a reservoir by a feed pump and in the process, via a movable wall, positively displaces compressed gas, which can flow back into a compressed gas container via an opened bypass shutoff valve, a bypass line, and a compressed gas shutoff valve. During the procedure of testing the specimen, the compressed gas from the compressed gas reservoir acts upon the test liquid with a constant pressure, regulated via the pressure regulating valve. The method is especially suitable for use in a test apparatus for testing injection valves and Diesel injection nozzles.

10 Claims, 2 Drawing Sheets

METHOD FOR GENERATING A CERTAIN CONSTANT PRESSURE IN A TEST LIQUID OF A TEST APPARATUS

BACKGROUND OF THE INVENTION

The invention is based on a method for generating a certain constant pressure in a test liquid of a test apparatus. A method is already known (German Patent Disclosure DE 27 57 318 A1), in which to generate the pressure in the test liquid, a compressed gas is used that is furnished by a pump. As a consequence of the delivery of test liquid to the reservoir, compressed gas is carried out of the reservoir into the atmosphere, which is very expensive when nitrogen is used as the compressed gas. Moreover, the constantly required pumping of the compressed gas by the pump causes pressure fluctuations in the test apparatus, and generates increased noise.

OBJECT AND SUMMARY OF THE INVENTION

A method of the invention has the advantage over the prior art that in a simple way, losses of compressed gas can be virtually entirely prevented, and the furnishing of the compressed gas involves no fluctuation or noise. Hydraulic pressures can be generated with high precision, and in particular even high pressures up to about 210 bar.

Advantageous further features of and improvements to the method disclosed are possible with the provisions recited hereinafter.

It is especially advantageous when a test liquid is delivered to the reservoir to turn off the pressure regulating valve, or to open a bypass around the pressure regulating valve. Rapid filling of the reservoir with test liquid can be achieved as a result.

It is also advantageous, parallel to the one reservoir and the one compressed gas container, to connect a further reservoir and a further compressed gas container and to drive them in alternation with the first ones, so that when the one reservoir is filled with test liquid, testing of specimens can be carried on using the other reservoir; in other words, no interruption is necessary.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
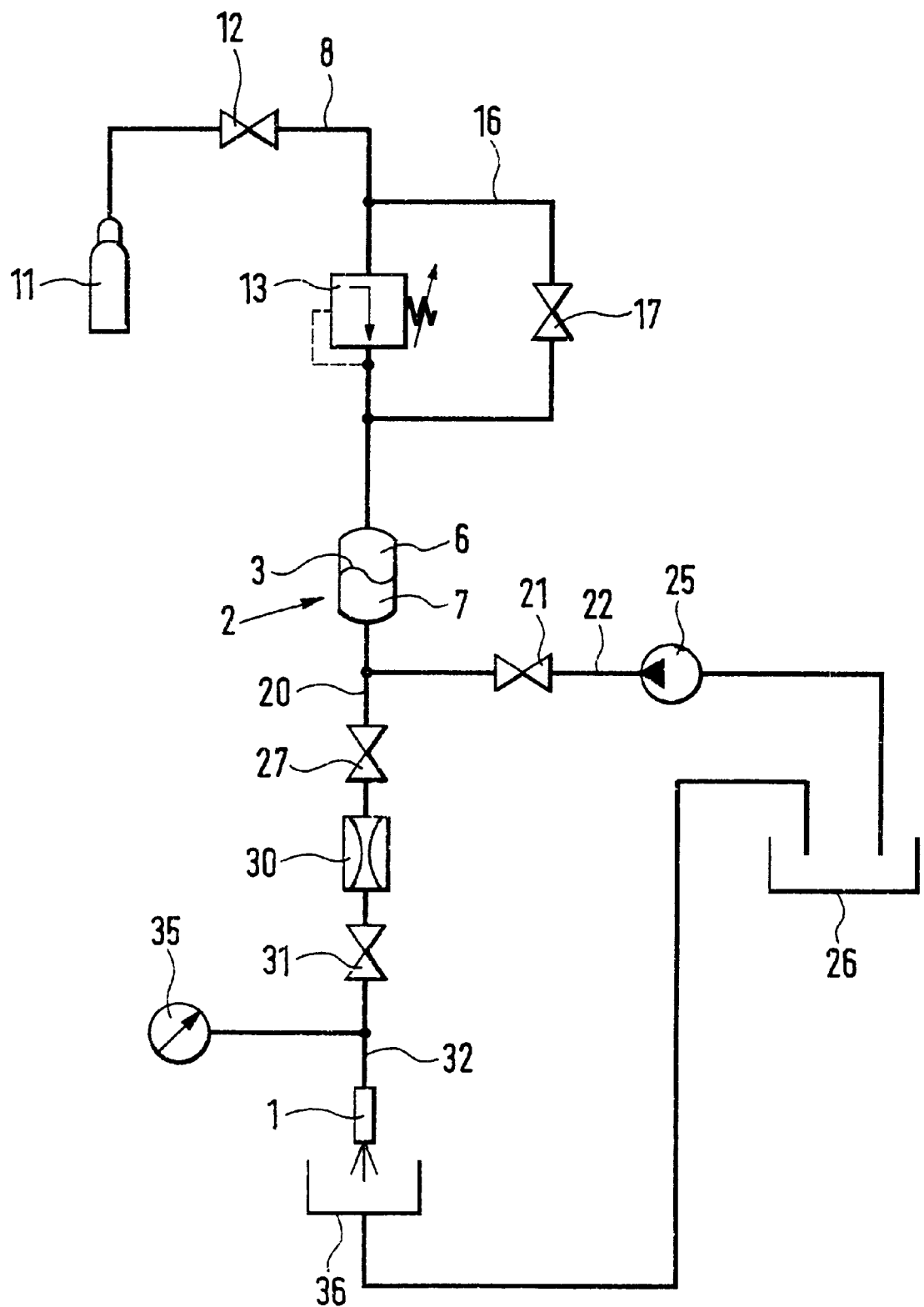
FIG. 1 shows a first exemplary embodiment of a test apparatus embodied according to the invention.

The test apparatus shown in FIG. 1 is used to test specimens 1. Known gasoline injection valves, in particular high-pressure direct-injection valves, injection nozzles for Diesel injection, and the like are used as the specimens 1. The test apparatus has a reservoir 2 of known construction, for instance a so-called bladder reservoir, which has a movable wall 3 that divides a reservoir chamber 6 for compressed gas from a reservoir chamber 7 for pressurized liquid. A diaphragm or a dividing piston can be used as the movable wall 3. Communicating with the reservoir chamber 6 for compressed gas is one end of a compressed gas line 8, whose other end is connected to a compressed gas container 11. Disposed in the compressed gas line 8 is a compressed gas shutoff valve 12, and disposed between the compressed gas shutoff valve 12 and the reservoir chamber 6 is a pressure regulating valve 13, which regulates a predetermined constant pressure, which is adjustable at the pressure regulating valve 13, in the reservoir chamber 6 for compressed gas. Communicating with the compressed gas line 8 is a bypass line 16, which bypasses the pressure regulating valve 13 and in which a bypass shutoff valve 17 is disposed. The compressed gas shutoff valve 12 and the bypass shutoff valve 17 can be actuatable either manually or, in a manner not shown, electromagnetically by triggering done by an electronic control unit. The actuation can also be accomplished pneumatically or hydraulically.

Communicating with the reservoir chamber 7 is a pressure line 20, which is separated by a feed shutoff valve 21 from a feed line 22, into which a feed pump 25 pumps test liquid under pressure, which it aspirates from a supply container 26 or receives from an interposed prefeed pump, not shown. Known pumps, such as a Diesel in-line pump or a diaphragm pump, are used as the feed pump 25. A branch from the pressure line 20 for test liquid leads to a test shutoff valve 27, downstream of which a known flow meter 30 is connected to the pressure line 20. A connection shutoff valve 31 is disposed downstream of the flow meter 30 in the pressure line 20. The feed shutoff valve 21, test shutoff valve 27 and connection shutoff valve 31 are actuatable either manually or electromagnetically, under the control of an electronic control unit. The actuation can also be done pneumatically or hydraulically. Downstream of the connection shutoff valve 31, a connection line 32 leads to the specimen 1. A known pressure sensor 35 is connected to the connection line 32. The test liquid emerging from the specimen 1 is collected in a catch pan 36 and returned to the supply container 26 or disposed of in some other way.

By performing the method of the invention, the compressed gas container 11 is connected to the compressed gas line 8, and both the compressed gas shutoff valve 12 and the bypass shutoff valve 17, or the pressure regulating valve 13, are opened. Now the feed shutoff valve 21 is opened, while the test shutoff valve 27 and the connection shutoff valve 31 both remain in the closed position. The feed pump 25 then pumps test liquid out of the supply container 26 into the reservoir chamber 7 for test liquid via the opened feed shutoff valve 21, and as a result the movable wall 3 is moved into the reservoir chamber 6 for compressed gas, and the compressed gas, such as nitrogen, is positively displaced into the compressed gas container 11. If the reservoir chamber 7 is filled with test liquid, then the feed shutoff valve 21 is closed and the feed pump 25 is shut off. If testing of a specimen 1 connected to the connection line 32 is now to be performed, then the bypass shutoff valve 17 is connected to the compressed gas line 8, or the pressure regulating valve 13 is activated and the compressed gas shutoff valve 12 is opened. After that, the test shutoff valve 27 and the connection shutoff valve 31 are opened at the branch of the pressure line 20, and by means of the flow meter 30 the quantity of test liquid dispensed into the catch pan 36 from the specimen 1 as well as its pressure can be ascertained by means of the pressure sensor 35. In this way, it is possible for instance to determine the opening pressure, the leakage quantity, and the static injection quantity and the dynamic injection quantity of a fuel injection valve or Diesel injection nozzle. During the test procedure, the pressure of the pressurized liquid present at the specimen 1 is kept constant in the pressure line 20 by providing that the pressure regulating valve 13 keeps the pressure of the compressed gas in the reservoir chamber 6 constant, with very high accuracy, on the basis of the compressed gas flowing out of the compressed gas container 11 as replenishment. The compressed gas positively displaced into the compressed gas container 11 from the reservoir 2 during the filling operation now swings back into the reservoir 2 during the test procedure. This described swinging or pendulum motion of the compressed gas upon filling of the reservoir 2 with test liquid and during the procedure of testing the specimen 1 between the reservoir 2 and the compressed gas container 11 takes place virtually without any loss of compressed gas, even over a very high number of test procedures.

Figure 2:
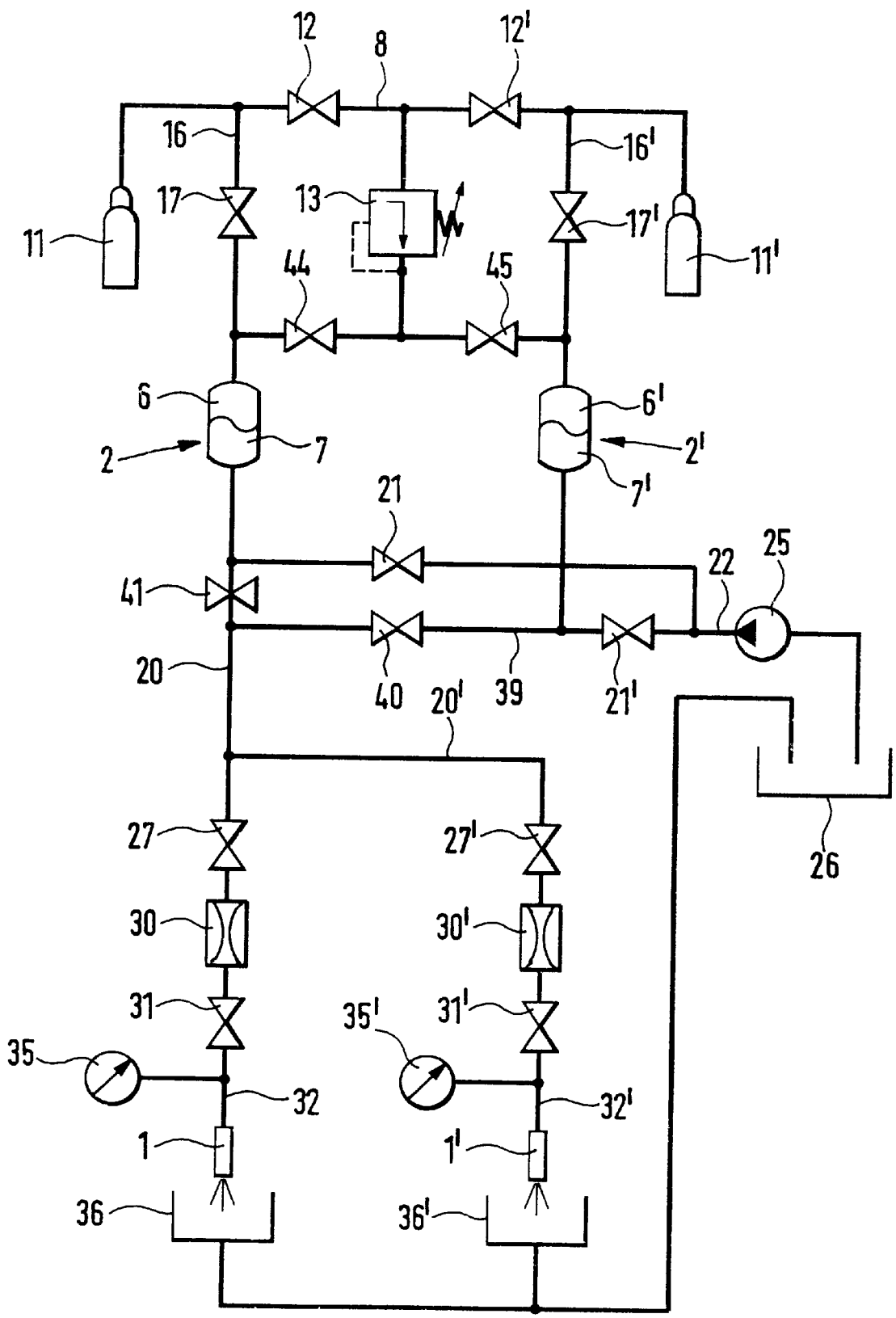
FIG. 2 shows a second exemplary embodiment of a test apparatus according to the invention, which enables continuous testing of specimens.

In the second exemplary embodiment of a test apparatus embodied according to the invention and as shown in FIG. 2, those elements that are the same and function the same as in the first exemplary embodiment of FIG. 1 are identified by the same reference numerals. In the test apparatus of FIG. 2, all the elements identified by a reference numeral with a prime are elements that have identically functioning counterparts in the test apparatus of FIG. 1 and that by doubling the test apparatus of FIG. 1 for the test apparatus of FIG. 2 make it possible simultaneously or in alternation to test two specimens 1 and 1' or to load and unload the reservoir 2 and 2' in alternation and thus make it possible to furnish test liquid continuously. Hence in FIG. 2 one further reservoir 2' is provided, whose reservoir chamber 7' communicates with a branch line 39 that branches off from the feed line 22 and leads to the pressure line 20, bypassing the feed shutoff valve 21. In the branch line 39, there are a further feed shutoff valve 21' toward the feed line 22 and a first branch shutoff valve 40 toward the pressure line 20. The connection of the reservoir chamber 7' and the branch line 39 is located between the further feed shutoff valve 21' and the first branch shutoff valve 40. The second branch shutoff valve 41 is located between the reservoir chamber 7 of the reservoir 2 and the discharge point of the branch line 39 into the pressure line 20.

The reservoir chamber 6' of the further reservoir 2' communicates with a further compressed gas container 11' via the only single pressure regulating valve 13 and a further compressed gas shutoff valve 12'. The first compressed gas shutoff valve 12' and the pressure regulating valve 13 are bypassed by means of a further bypass line 16' and a further bypass shutoff valve 17'. A first reservoir shutoff valve 44 is disposed between the reservoir chamber 6 of the one reservoir 2 and the pressure regulating valve 13 in the compressed gas line 8, and a second reservoir shutoff valve 45 is disposed between the further reservoir chamber 6' of the further reservoir 2' and the pressure regulating valve 13.

The design of the test apparatus of FIG. 2 makes it possible either to test the specimens 1 and 1' simultaneously, by opening the test shutoff valves 27, 27' and the connection shutoff valves 31, 31' simultaneously, or to test the specimen 1 first by first opening only the test shutoff valve 27 and the connection shutoff valve 31 and subsequently closing the test shutoff valve 27 and connection shutoff valve 31 and then opening the further test shutoff valve 27' and the further connection shutoff valve 31' in order to test the specimen 1'. During that time the specimen 1 can also be changed, making for better time utilization of the test apparatus. By providing two reservoirs 2 and 2', it is possible, during the time within which the test apparatus is supplied with pressurized liquid from the one reservoir, to fill the other reservoir with pressurized liquid and then to use this further reservoir for supplying the test apparatus with pressurized liquid while the first reservoir is being refilled with pressurized liquid. Thus in a test procedure with the one reservoir 2, the second branch shutoff valve 41 is opened, while the one feed shutoff valve 21 and the first branch shutoff valve 40 are closed, and the feed pump 25 delivers test liquid to the further reservoir 2' until that reservoir is filled. If the one reservoir 2 no longer contains enough test liquid, then the second branch shutoff valve 41 is closed, and with the further feed shutoff valve 21' also closed the feed shutoff valve 21 and the first branch shutoff valve 40 are opened, so that for the test procedure test liquid from the further reservoir 2' is available and the feed pump 25 can fill the one reservoir 2 with test liquid.

The first branch shutoff valve 40, second branch shutoff valve 41, first reservoir shutoff valve 44 and second reservoir shutoff valve 45 can be actuated manually or electromagnetically by triggering by an electronic control unit, not shown. The actuation can also be done pneumatically or hydraulically.

In the exemplary embodiment of FIG. 2 it is expedient to embody at least part of the feed line 22 as an elastic, flexible, high-pressure hose, to avoid transmitting pressure fluctuations to the test procedure when the feed pump 25 is operated in alternation.

The foregoing relates to preferred exemplary embodiments of the invention, it being understood that other variants and embodiments thereof are possible within the spirit and scope of the invention, the latter being defined by the appended claims.

We claim:

1. A method for generating a constant pressure in a test fluid of a test apparatus, which comprises directing a compressed gas from a compressed gas tank via a first shutoff valve (12) into a first chamber of a double chamber reservoir, directing a test fluid from a test fluid supply container via a second shutoff valve (21) into a second chamber of said double chamber reservoir thereby forcing the compressed gas in said first chamber of said reservoir back into said compressed gas tank, closing said second shutoff valve to prevent test fluid from flowing back into said supply container, opening at least a third shutoff valve (27) in a test line from said reservoir to a test specimen thereby permitting test gas to flow to said test specimen, again applying compressed gas from said compressed gas tank via a pressure regulator valve (13) back into said first chamber of said reservoir thereby forcing the test fluid via said test line to the test specimen, and maintaining a constant pressure within said first chamber of said reservoir during a test procedure, measuring a pressure of the test fluid prior to passing through said test specimen, and directing any test fluid passing through said test specimen into a catch pan.

2. A method as set forth in claim 1 which comprises directing the compressed gas through a fourth valve in a bypass line in parallel with said pressure regulator valve while directing the compressed gas via the pressure regulator valve.

3. A method as set forth in claim 2 which comprises operating a fifth shutoff valve (31) in said test line between said third shutoff valve and said specimen in order to permit the test fluid to pass through said specimen, and directing the test fluid via a flow meter between said third shutoff valve and said fifth valve.

4. A method for generating a constant pressure in a test fluid of a test apparatus which comprises, directing a compressed gas from first and second compressed gas containers connected in parallel via like first shutoff valves to a first chamber of at least one double chamber reservoir, directing a test fluid from a test fluid supply via at least one like second shutoff valve in parallel lines to a second chamber of said at least one double chamber reservoir, thereby forcing compressed gas from said first chamber back to said first and second compressed gas containers, opening at least one third shutoff valve from said at least one double chamber reservoir in a test line connected to at least one test specimen, again applying compressed gas from at least one of said compressed gas containers to said first chamber of said at least one double chamber reservoir via a pressure regulator in order to apply a compressed gas of constant pressure to said first chamber of said at least one double chamber reservoir, directing the test fluid from said second chamber of said at least one double chamber reservoir to at least one specimen connected to a test line.

5. The method as set forth in claim 4 in which said compressed gas is directed from at least one of said compressed gas containers via at least one like fourth shutoff valve in parallel with said pressure regulator valve.

6. The method as set forth in claim 5 which includes connecting two double chamber reservoirs between said pressure regulator valve and first and second test lines to first and second specimens.

7. The method as set forth in claim 6 which comprises applying compressed gas via said regulator valve in alternation from said first and second compressed gas containers to said first and second double chamber reservoirs.

8. The method as set forth in claim 7 which includes connecting a like fifth cutoff valve between said pressure regulator valve and each of said first and second double chamber reservoirs.

9. The method as set forth in claim 4, which comprises inserting a flow meter in said test line ahead of said at least one specimen, and connecting a pressure sensor 35 in the test line between the flow meter and the test specimen.

10. The method as set forth in claim 9 which comprises connecting a sixth and seventh cutoff valve on opposite sides of said flow meter.

\* \* \* \* \*